(12) United States Patent  
Shirako et al.

(10) Patent No.: US 7,616,880 B2
(45) Date of Patent: Nov. 10, 2009

(54) ADAPTER RING FOR ROTATION OF PHOTOGRAPHING LENS BARREL

(75) Inventors: Hideo Shirako, Tokyo (JP); Shinichi Watanabe, Kawaguchi (JP)

(73) Assignee: Olympus Imaging Corp., tokyo (JP)

( * ) Notice: Subject to any disclaimer, the term of this patent is extended or adjusted under 35 U.S.C. 154(b) by 457 days.

(21) Appl. No.: 11/491,760

(22) Filed: Jul. 24, 2006

(65) Prior Publication Data

US 2007/0020987 A1    Jan. 25, 2007

(30) Foreign Application Priority Data

Jul. 25, 2005    (JP)    ............... 2005-214276

(51) Int. Cl.
*G03B 7/04*    (2006.01)
*G03B 17/08*    (2006.01)
*G03B 3/00*    (2006.01)
*G02B 15/14*    (2006.01)
*G02B 7/02*    (2006.01)

(52) U.S. Cl. .................. 396/144; 396/25; 396/530; 359/676; 359/701; 359/825

(58) Field of Classification Search .......... 396/144, 396/25, 27, 29, 529, 530; 359/676, 701, 359/825
See application file for complete search history.

(56) References Cited

U.S. PATENT DOCUMENTS

| | | | | |
|---|---|---|---|---|
| 1,559,062 A | * | 10/1925 | Anderson | ............... 607/90 |
| 3,698,254 A | * | 10/1972 | Bradt | ............... 74/143 |
| 4,553,817 A | * | 11/1985 | Ando et al. | ............... 359/824 |
| 5,105,312 A | * | 4/1992 | Tiffen et al. | ............... 359/892 |
| 5,177,523 A | * | 1/1993 | Huang et al. | ............... 396/132 |
| 6,389,238 B1 | * | 5/2002 | Suzuki | ............... 396/534 |

* cited by examiner

*Primary Examiner*—Rochelle-Ann J Blackman
(74) *Attorney, Agent, or Firm*—Straub & Pokotylo; John C. Pokotylo

(57) ABSTRACT

There is disclosed an adapter ring for rotation of a photographing lens barrel, the adapter ring being fitted into an outer periphery of the photographing lens barrel, the adapter ring being rotated through engaging with a ratchet wheel having a plurality of pawls which ratchet wheel rotates in conjunction with a dial disposed in a waterproof protector. This adapter ring has: a plurality of first projecting portions arranged in a predetermined angle range around an optical axis in the outer periphery to engage with the pawls of the ratchet wheel; and a plurality of second projecting portions which are the same plurality of projecting portions as the plurality of first projecting portions, the second projecting portions being arranged in a predetermined angle range but out of the predetermined angle range of the plurality of the first projecting portions.

6 Claims, 7 Drawing Sheets

(Prior Art)

(Prior Art)

ADAPTER RING FOR ROTATION OF PHOTOGRAPHING LENS BARREL

CROSS-REFERENCE TO RELATED APPLICATION

This application is based upon and claims the benefit of priority from prior Japanese Patent Application Nos. 2005-214276, filed Jul. 25, 2005, the entire contents of which are incorporated herein by reference.

BACKGROUND OF THE INVENTION

1. Field of the Invention

The present invention relates to an adapter ring for rotation of a photographing lens barrel, the adapter ring being fitted into an outer periphery of the photographing lens barrel to rotate a rotation ring of the photographing lens barrel by an operation from the outside.

2. Description of the Related Art

In recent years, with prevailing of outdoor sports, there increase underwater photograph lovers who photograph underwater living things during diving. To perform the photographing in water, a waterproof protector (waterproof case, waterproof housing) is used for a camera such as a digital camera, and a button or a dial of the camera in the waterproof protector is operated via a button or a dial disposed in the waterproof protector.

In a case where a single lens reflex camera equipped with a zoom lens is used during the underwater photographing, a rotation ring such as a zoom ring which is an operation ring disposed in a photographing lens (zoom lens) in the waterproof protector is operated and rotated via a dial (zoom knob) disposed in the waterproof protector.

FIG. 6A is a plan view of a conventional adapter ring 340 for rotation of a photographing lens barrel, and FIG. 6B is a front view of the adapter ring 340. The adapter ring 340 is constituted of a pair of semicircular rings 340L, 340R rotatably connected to each other by a hinge portion 342. An engaging pawl is disposed on a free end (the other end that is not the hinge portion) of one of the semicircular rings 340L, 340R, and an engaging protrusion is disposed on the other free end. The engaging pawl and the engaging protrusion form an engagement portion 344. Moreover, a projecting portion group 340-1 is constituted of a plurality of projecting portions 340-1a which can engage with a ratchet wheel (not shown) disposed in the waterproof protector, and is disposed on an outer periphery of one of the pair of semicircular rings 340L, 340R so that the projecting portions are mutually isometrically arranged around the rotation ring in a predetermined angle range.

In the adapter ring 340 of FIGS. 6A, 6B, the semicircular ring 340L is provided with 15 projecting portions 340-1a which are arranged isometrically in an angle range of 140 degrees. On the other hand, any projecting portion is not disposed on the semicircular ring 340R. It is to be noted that each of constituting members such as the hinge portion 342 and the semicircular rings 340L, 340R is molded of a plastic. When the engagement of the engagement portion 344 is cancelled, the semicircular rings 340L, 340R are released in an arrow direction.

When the above adapter ring 340 is attached to the photographing lens barrel (zoom lens), an operator covers the photographing lens barrel with the opened semicircular rings 340L, 340R, and then engages the engaging pawl formed on one semicircular ring with the engaging protrusion pawl formed on the other semicircular ring. Accordingly, the adapter ring 340 is fitted into the outer periphery of the zoom ring of the photographing lens barrel.

The adapter ring 340 is rotated by the dial (zoom knob) disposed on the waterproof protector. FIG. 7A is a plan view showing the engagement of the ratchet wheel of a dial 322 with the adapter ring 340, and is a diagram showing a state before the engagement. FIG. 7B is a plan view showing an engaging state. The dial 322 includes: a large-diameter dial head 322-1; a shaft portion 322-2 which extends from the dial head 322-1 to pass through a through hole 20Fa of a front cover of the waterproof protector; and a ratchet wheel 322-3 attached to a distant end of the shaft portion. In the dial head 322-1, five projecting portions are formed, and a series of slip stoppers 322-1a are formed on outer peripheries of the projecting portions. The ratchet wheel 322-3 is formed into a disc-like shape, and in the vicinity of the outer periphery of the wheel, a plurality of pawls 322-3a extending in an axial direction of the shaft portion 322-2 are mutually isometrically arranged around an axis of the shaft portion.

In a camera in which the adapter ring 340 is fitted into the outer periphery of the photographing lens barrel, as shown in FIG. 7A, the dial head 322-1 is pulled in the OUT-direction (direction directed externally in a diametric direction of the outer periphery of the photographing lens) to retract the pawls 322-3a of the ratchet wheel 322-3 to a position where the pawls do not collide with the projecting portions 340-1a of the adapter ring. In this state, the camera is stored in the waterproof protector. Moreover, after storing the camera, the dial head 322-1 is pushed in a direction reverse to the OUT-direction, so that the pawls 322-3a of the ratchet wheel 322-3 engage with the projecting portions 340-1a of the adapter ring 340. During the photographing, the pawls 322-3a of the ratchet wheel engage with the projecting portions 340-1a of the adapter ring. Therefore, when the dial head 322-1 is rotated, the ratchet wheel 322-3 is rotated. With the rotation of the ratchet wheel 322-3, the adapter ring 340 rotates together with the zoom ring of the photographing lens barrel. Accordingly, a desired zoom position is set.

BRIEF SUMMARY OF THE INVENTION

In the present invention, it is noted that since a rotation range of a zoom ring or the like of a zoom lens is usually less than 180 degrees, there exists a space for arranging, in addition to a plurality of projecting portions to engage with pawls of a ratchet wheel, another plurality of projecting portions (spare projecting portions) as spares in an outer periphery of an adapter ring, and the present invention is characterized that a plurality of projecting portions are arranged on the space as spares.

One example of a constitution of the present invention will be described. There is provided an adapter ring for rotation of a photographing lens barrel, the adapter ring being fitted into an outer periphery of the photographing lens barrel, the adapter ring being rotated through engaging with a ratchet wheel having a plurality of pawls which ratchet wheel rotates in conjunction with a dial disposed in a waterproof protector, the adapter ring having: a plurality of first projecting portions arranged in a predetermined angle range around an optical axis in the outer periphery to engage with the pawls of the ratchet wheel; and a plurality of second projecting portions which are the same plurality of projecting portions as the plurality of first projecting portions, the second projecting portions being arranged in a predetermined angle range but out of the predetermined angle range of the plurality of the first projecting portions.

In the present invention, a plurality of spare projecting portions are arranged in the adapter ring as such. Therefore, even in a case where the projecting portions of the adapter ring are worn to such an extent that the ratchet wheel idles, when the adapter ring is set again so that the plurality of spare projecting portions engage with the pawls of the ratchet wheel, photographing in water may continuously be performed.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
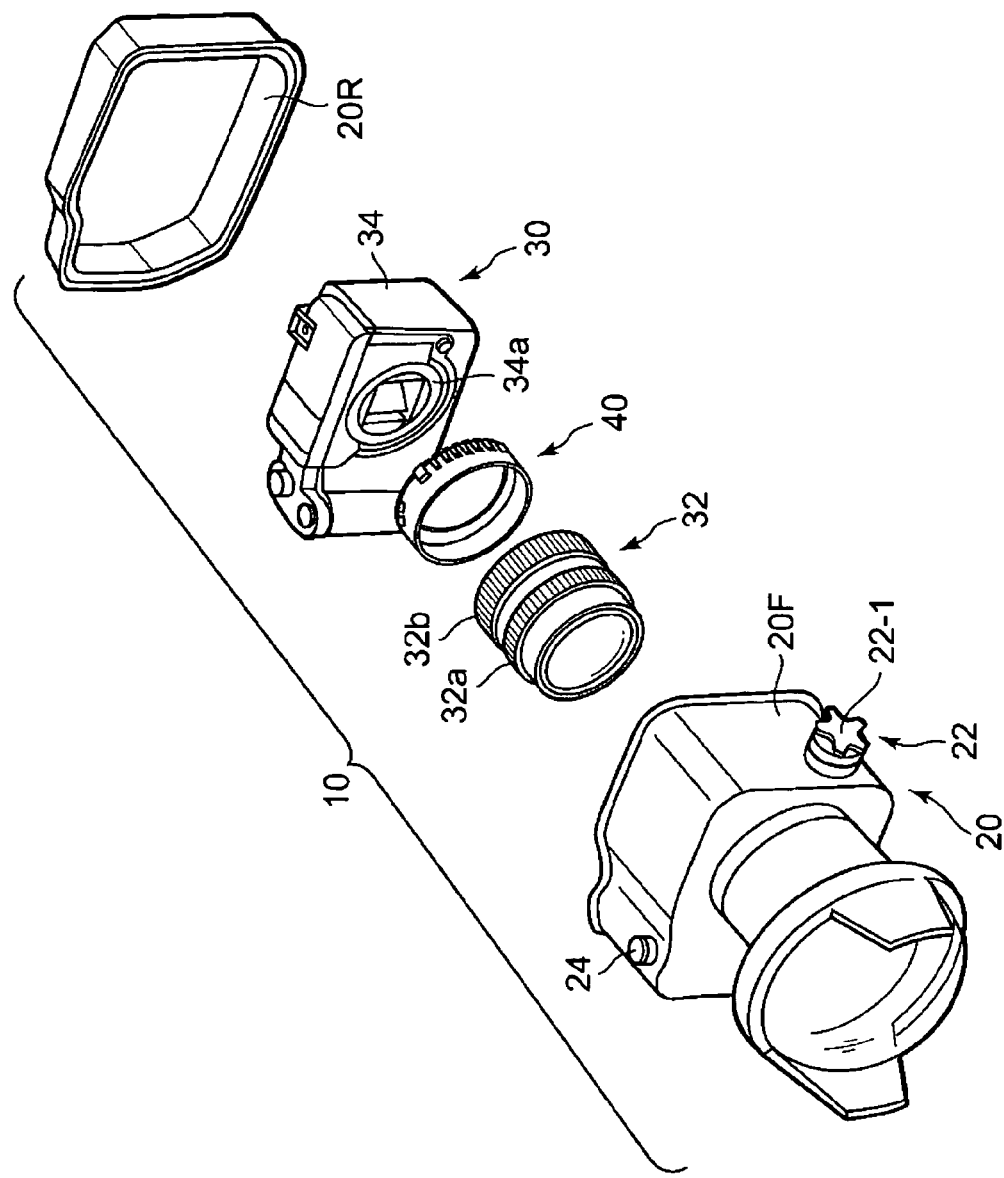
FIG. 1 is an exploded perspective view of an underwater camera system in which a camera provided with an adapter ring of a first embodiment of the present invention is stored in a waterproof protector.
Figure 2A:
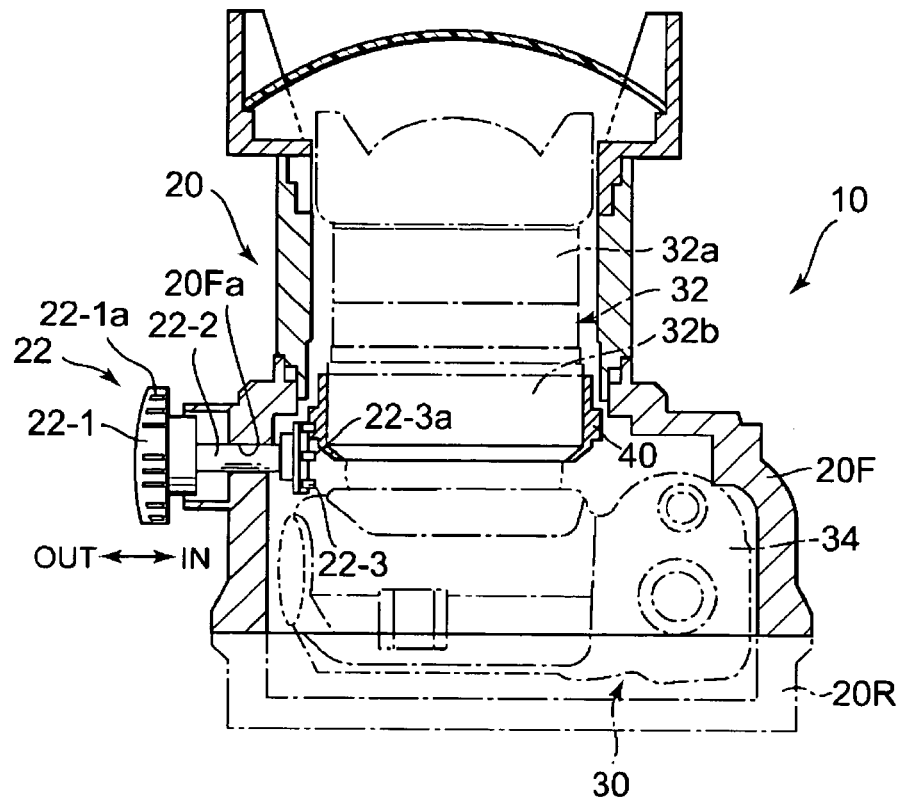
FIG. 2A is a laterally sectional view of the waterproof protector along an optical axis of the underwater camera system.
Figure 2B:
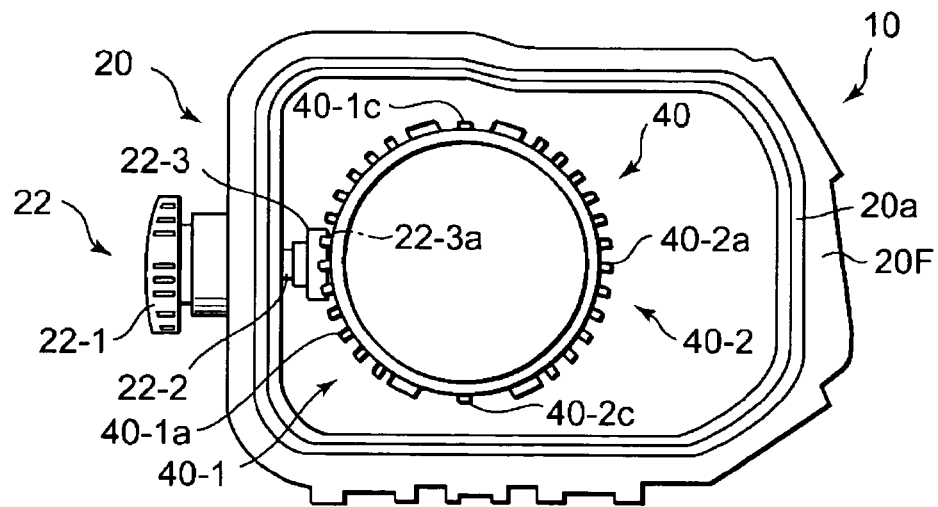
FIG. 2B is a schematic rear view of the underwater camera system, from which a rear cover of the waterproof protector and the camera are omitted.
Figure 3:
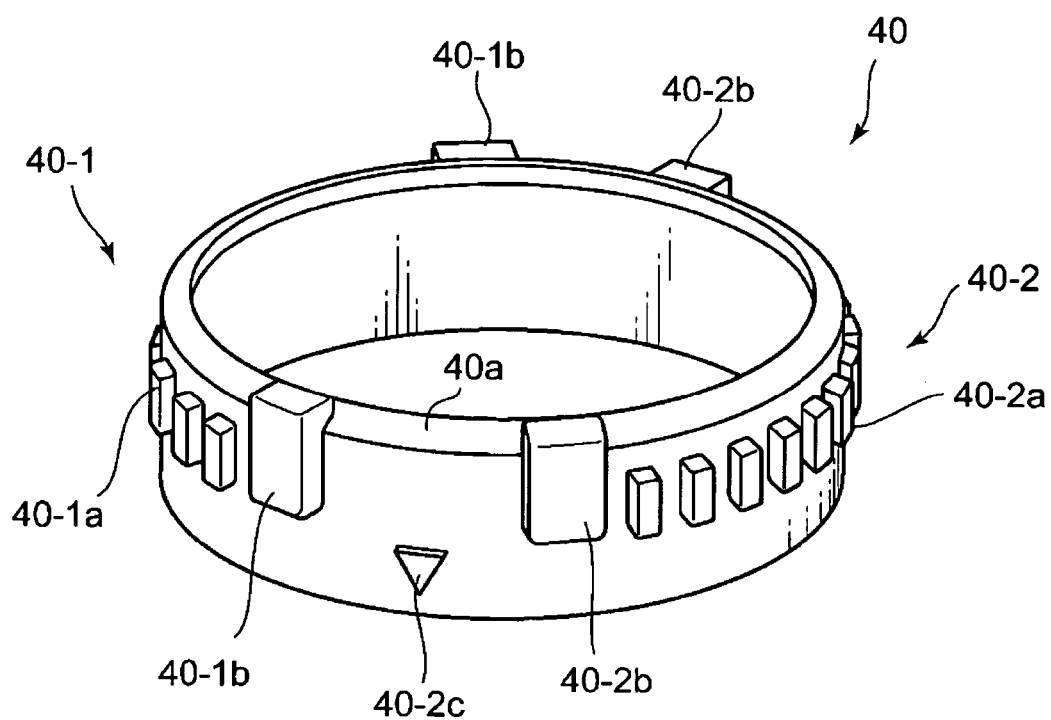
FIG. 3 is a perspective view of the adapter ring in the first embodiment of the present invention.

There will be described an adapter ring for rotation of a photographing lens barrel in a first embodiment of the present invention with reference to FIGS. 1, 2A and 2B. It is to be noted that FIG. 2B has a purpose of showing only engagement between a ratchet wheel on a waterproof protector side and an adapter ring on a photographing lens barrel, and illustrations of members which are not related to the engagement are omitted to avoid complication of the drawing. As shown in FIGS. 1, 2A and 2B, an underwater camera system 10 has a waterproof protector (waterproof case, waterproof housing) 20 and a camera 30. The waterproof protector 20 is divided into a front cover 20F and a rear cover 20R connected to the front cover in a watertight manner via an O-ring 20a on an end face of the front cover. The waterproof protector 20 is molded of a transparent plastic such as polycarbonate, and the camera 30 is stored in the waterproof protector 20, and protected from water.

The camera 30 is, for example, a single lens reflect camera in which a changeable photographing lens 32 is attached to a body mount 34a of a camera main body 34. The photographing lens 32 is a photographing lens barrel (zoom lens) having a focus ring 32a and a zoom ring 32b which are rotation rings as operation rings. An adapter ring 40 of the present invention is fitted into the zoom ring 32b from behind the lens mount of the photographing lens 32 (zoom lens, photographing lens barrel). When an operator rotates the adapter ring 40 to thereby rotate the zoom ring 32b, telephoto or wide-angle zoom photographing is performed.

A dial (zoom knob) 22 for rotation of the adapter ring 40 is disposed on the right side surface of the front cover 20F of the waterproof protector as viewed from a subject side. This dial 22 includes: a large-diameter dial head 22-1; a shaft portion 22-2 which extends from the dial head to slidably pass through a through hole 20Fa in a side wall surface of the front cover; and a ratchet wheel 22-3 attached to a distant end of the shaft portion. It is to be noted that around the shaft portion 22-2, a watertight O-ring (not shown) is wound. In the dial head 22-1, five projecting portions are formed, and a series of slip stoppers 22-1a are formed on outer peripheries of the projecting portions. Moreover, the ratchet wheel 22-3 is formed into a disc-like shape, and in the vicinity of the outer periphery of the wheel, a plurality of pawls 22-3a extending in an axial direction of the shaft portion are mutually isometrically arranged around an axis of the shaft portion. Furthermore, the axial center of the shaft portion 22-2 is disposed in a position deviating from a circular movement track of each projecting portion of the adapter ring described later, and disposed substantially at right angles with respect to a rotation shaft of the zoom ring 32b (see FIG. 2A).

It is to be noted that a release button 24 is disposed on the top of the front cover 20F. Besides the shown dial 22 and release button 24, a large number of buttons and dials are disposed in the waterproof protector 20. When the dial or the button of the waterproof protector is operated to thereby operate the corresponding button on a camera side, photographing in water is performed. To avoid complication of the drawing, however, there are omitted illustrations of the buttons and dials of the waterproof protector except for the dial 22 and the release button 24.

As shown in FIGS. 3 and 4A to 4C, the adapter ring 40 has a shape provided with a flange 40a having a first projecting portion group 40-1 and a second projecting portion group 40-2 on the outer periphery of the ring. The first projecting portion group 40-1 is constituted of a plurality of, for example, twelve first projecting portions 40-1a arranged, respectively, in a predetermined angle range of, for example, 110 degrees. The second projecting portion group 40-2 is constituted of twelve second projecting portions 40-2a arranged, respectively, in an angle range of 110 degrees which is out of the predetermined angle range. In the first projecting portion group 40-1 and the second projecting portion group 40-2, first and second rotation limiting projecting portions 40-1b, 40-2b are formed as stoppers on or out of the opposite ends of each arrangement. Furthermore, first and second positioning marks 40-1c, 40-2c are formed between the rotation limiting projecting portions 40-1b and 40-2b on the outer periphery of the adapter ring 40.

It is to be noted that each first projecting portion 40-1a has the same shape as that of each second projecting portion 40-2a, the first rotation limiting projecting portion 40-1b has the same shape as that of the second rotation limiting projecting portion 40-2b, and the first positioning mark 40-1c has the same shape as that of the second positioning mark 40-2c. Therefore, the adapter ring 40 is provided with two combinations, each combination including twelve projecting portions, two rotation limiting projecting portions and one positioning mark.

The adapter ring 40 is attached to the photographing lens barrel (zoom lens) 32, and the camera 30 is stored in the waterproof protector 20, for example, as follows.

An operator aligns the first positioning mark 40-1c of the adapter ring 40 with the corresponding index of the photographing lens barrel (photographing lens) 32, for example, a numeral indicating an intermediate value in a numeral string indicating a zoom value disposed on the top of the zoom ring of the photographing lens. Moreover, the adapter ring 40 is fitted into the photographing lens barrel so that the flange 40a of the adapter ring 40 touches and is stopped by the edge of the photographing lens barrel (photographing lens) 32. In this manner, the first projecting portion group 40-1 constituted of the first projecting portions 40-1a is disposed in such a position as to engage with the pawls 22-3a of the ratchet wheel on the waterproof protector side. Furthermore, the operator attaches the photographing lens barrel 32 provided with the adapter ring 40 to the body mount 34a of the camera 30. Subsequently, after disposing the camera 30 in the front cover 20F of the waterproof protector, the operator disposes the rear cover 20R from behind the front cover to fix the rear cover to the front cover. As described above, the camera 30 is stored in the waterproof protector 20, and protected from water.

The adapter ring 40 is molded from an elastically deformable rubber-like member, for example, a rubber-like member having a rubber hardness of 80 degrees. Since a rubber molding mold is more inexpensive than a plastic molding mold, the adapter ring 40 can be produced more inexpensively than a conventional plastic adapter ring.

The adapter ring 40 formed of the elastically deformable rubber-like member is fitted into the photographing lens barrel 32 under elastic deformation. Therefore, since the adapter ring 40 can integrally be molded to form one unit, the number of constituting components remarkably decreases as compared with the plastic adapter ring which is difficult to be integrally molded. Also in this respect, the adapter ring 40 can inexpensively be produced. Since the adapter ring 40 is elastically deformable, unlike the conventional adapter ring, it is not necessary to strictly manage an assembly error of the photographing lens barrel 32 or a molding error of the adapter ring. However, these merits do not necessarily confine the material of the adapter ring 40 to rubber, but the adapter ring may be made of a plastic in the same manner as in the conventional adapter ring.

The pawls 22-3a of the ratchet wheel 22-3 ride on the rotation limiting projecting portions 40-1b disposed on or out of the opposite ends of the first projecting portions 40-1a, the dial head 22-1 and the ratchet wheel 22-3 become non-rotatable, and the rotation of the ratchet wheel 22-3 is limited. Therefore, if the pawls 22-3a of the ratchet wheel 22-3 are disposed in such positions as to engage with the first projecting portions 40-1a, the second projecting portions 40-2a are detached from the pawls 22-3a of the ratchet wheel 22-3. Since the second projecting portions do not engage with the pawls 22-3a of the ratchet wheel 22-3 by mistake, the second projecting portions are not worn when they are not used.

When the first projecting portions 40-1a engaging with the pawls 22-3a of the ratchet wheel 22-3 is worn out, thereby causing the ratchet wheel 22-3 to idle, the operator sets the adapter ring 40 again so as to engage the second projecting portions 40-2a on standby as spares with the pawls 22-3a of the ratchet wheel 22-3.

That is, when the ratchet wheel 22-3 idles, the operator once comes out of water, and disassembles the waterproof protector 20 to take out the camera 30. To take out the camera 30, the dial head 22-1 is pulled in the Out-direction of FIG. 4A to retract the pawls 22-3a of the ratchet wheel 22-3 to such a position that the pawls do not engage with the projecting portions 40-1a. The operator extracts the adapter ring 40 from the photographing lens barrel (zoom lens) 32, and rotates the ring as much as 180 degrees with respect to the zoom ring 32b to align the second positioning mark 40-2c with the above corresponding index of the photographing lens barrel 32. Moreover, the adapter ring 40 is fitted into the zoom ring 32b so that the flange 40a of the adapter ring 40 abuts on the end portion of the zoom ring 32b to attach the ring to the photographing lens barrel 32.

Figure 4A:
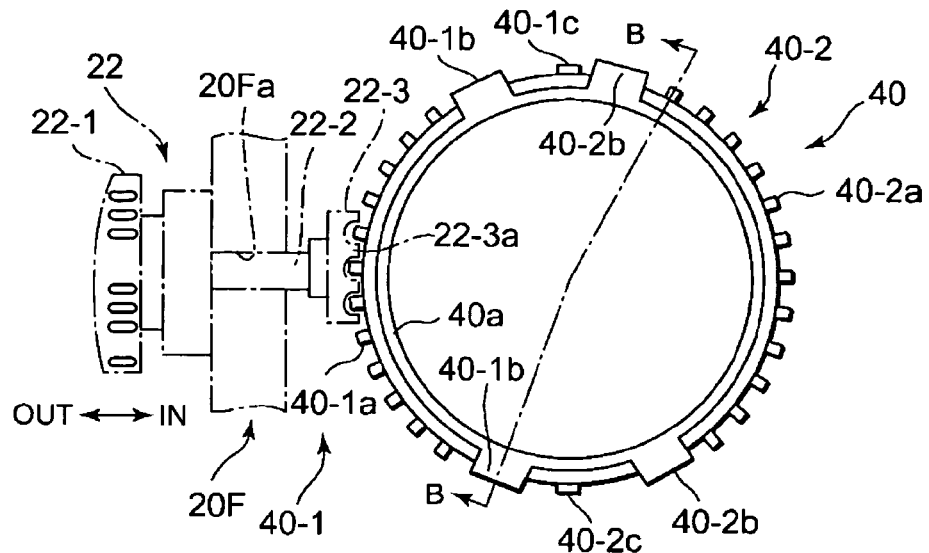
FIG. 4A is a plan view showing the adapter ring in the first embodiment of the present invention, in a case where a first positioning mark is aligned with a corresponding index of a photographing lens barrel.
Figure 4B:
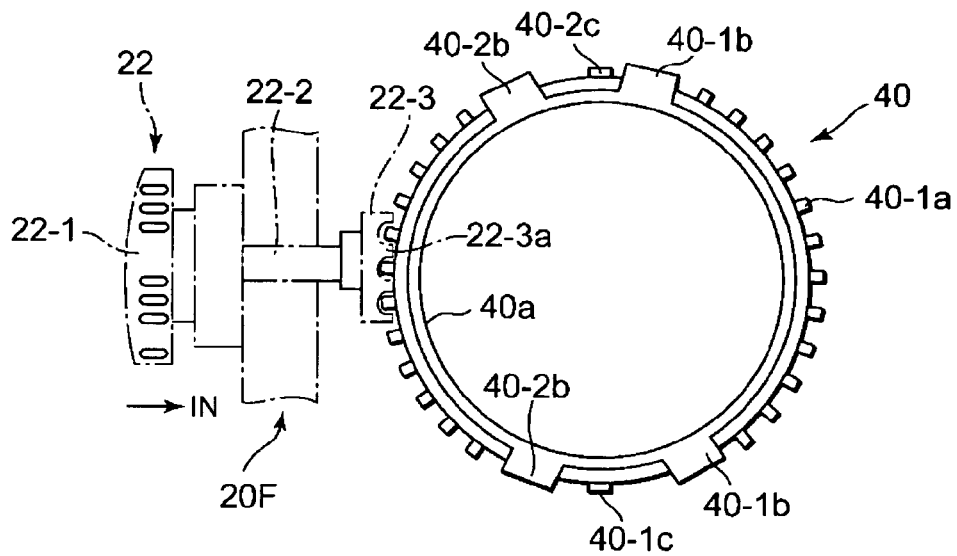
FIG. 4B is a plan view showing the adapter ring in the first embodiment of the present invention, in a case where a second positioning mark is aligned with the corresponding index of the photographing lens barrel.
Figure 4C:
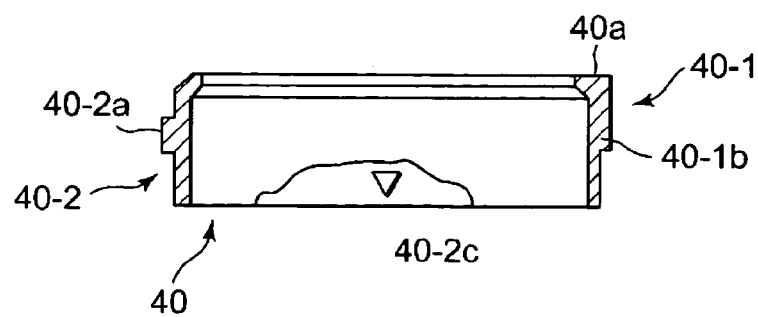
FIG. 4C is a sectional view cut along the B-B line of FIG. 4A.

Moreover, when the dial head 22-1 is pushed in an In-direction, as shown in FIG. 4B, the pawls 22-3a of the ratchet wheel 22-3 engage with the second projecting portions 40-2a. When the operator rotates the dial head 22-1 to rotate the ratchet wheel 22-3, the pawls 22-3a of the ratchet wheel 22-3 engage with the second projecting portions 40-2a to rotate the adapter ring 40, the zoom ring 32b is rotated to a desired position, and zoom photographing becomes possible.

It is to be noted that in the first embodiment, as the projecting portion group constituted of a plurality of projecting portions which engage with the pawls 22-3a of the ratchet wheel, the first and second projecting portion groups 40-1, 40-2 constituted of the first and second projecting portions 40-1a, 40-2a are disposed on the adapter ring 40. However, the number of the projecting portion groups is not limited to two. If a rotation range of the zoom ring 32b is small, three or more projecting portion groups may be disposed on the adapter ring 40. Moreover, the larger the number of the projecting portion groups is, the more the adapter ring can be set repeatedly. One adapter ring can continuously be utilized for a long period, and the photographing in water can continuously be performed without any spare adapter ring.

Moreover, the first and second projecting portion groups 40-1, 40-2 are arranged at angles which are equal to each other in the present embodiment, but the projecting portion groups may be arranged at unequal intervals on the outer periphery of the adapter ring. Needless to say, the projecting portions 40-1a or 40-2a in one projecting portion group are arranged at equal intervals, because they have to be driven by the ratchet wheel 22-3.

Next, a second embodiment of the present invention will be described.

Figure 5:
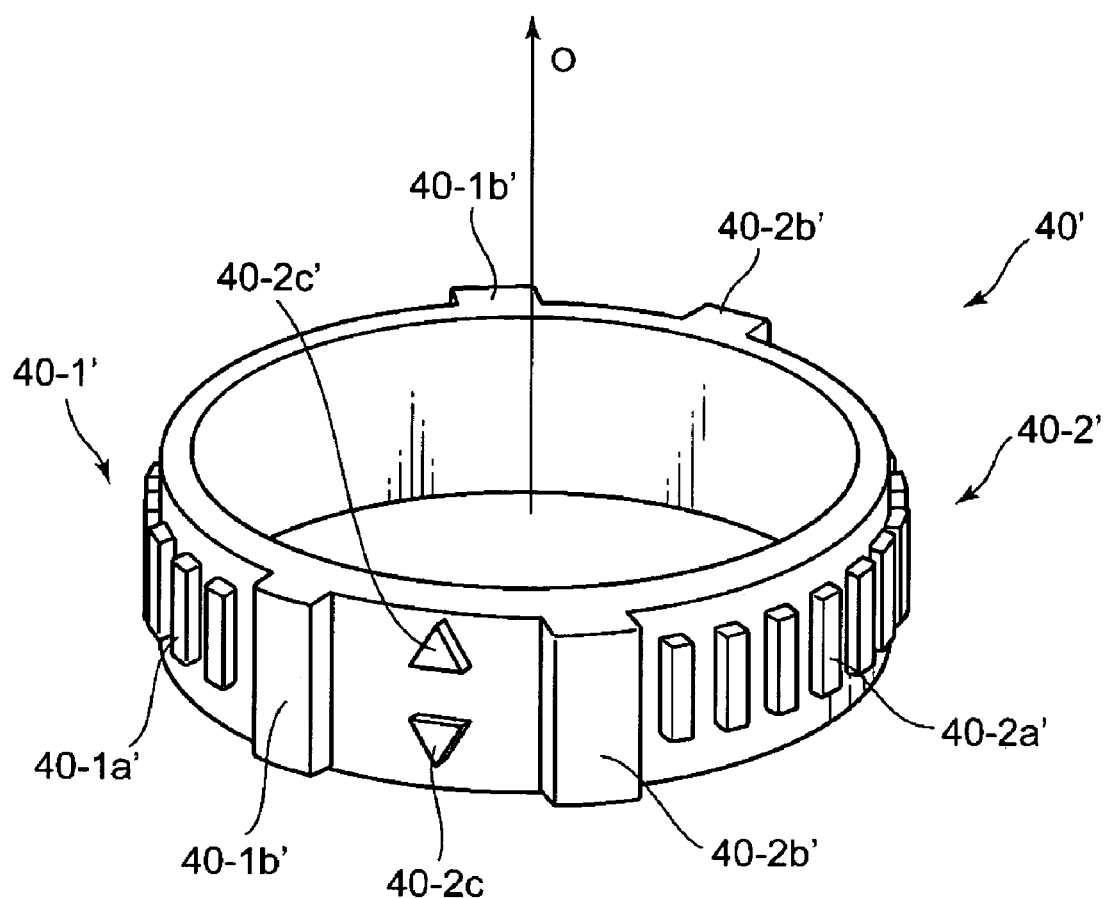
FIG. 5 is a perspective view of an adapter ring in a second embodiment of the present invention.
Figure 6A:
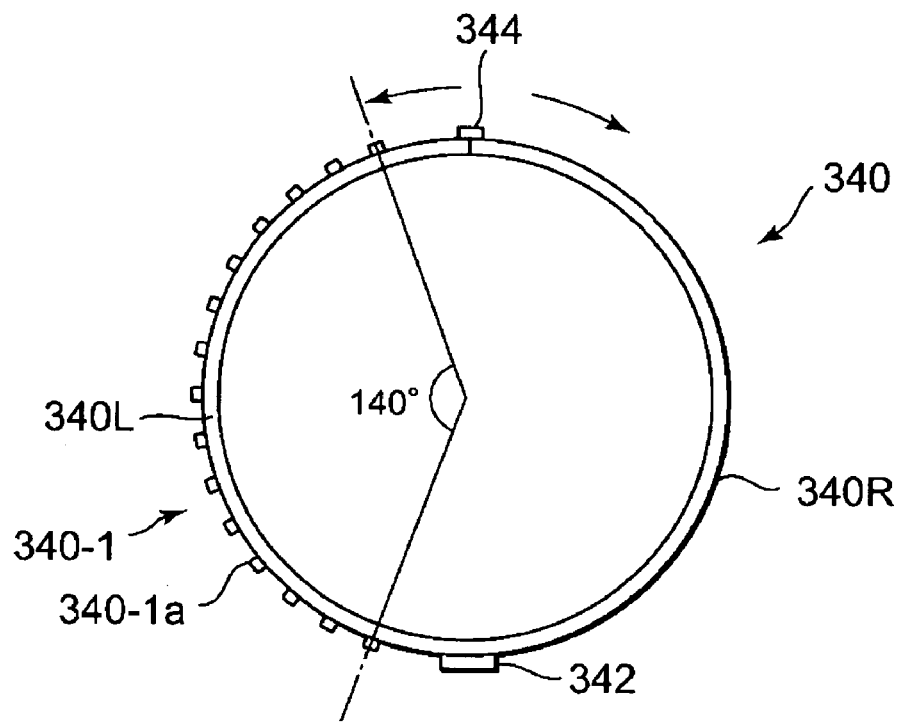
FIG. 6A is a plan view of a conventional adapter ring for rotation of a photographing lens barrel.
Figure 6B:
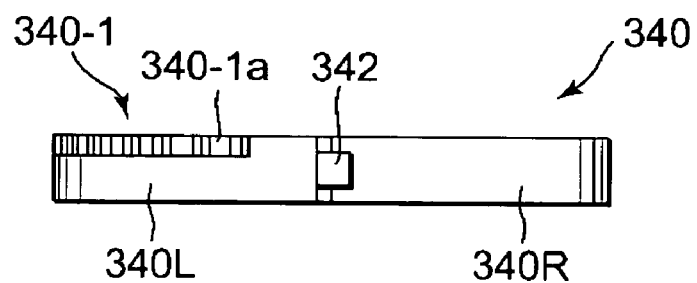
FIG. 6B is a plan view of the adapter ring.
Figure 7A:
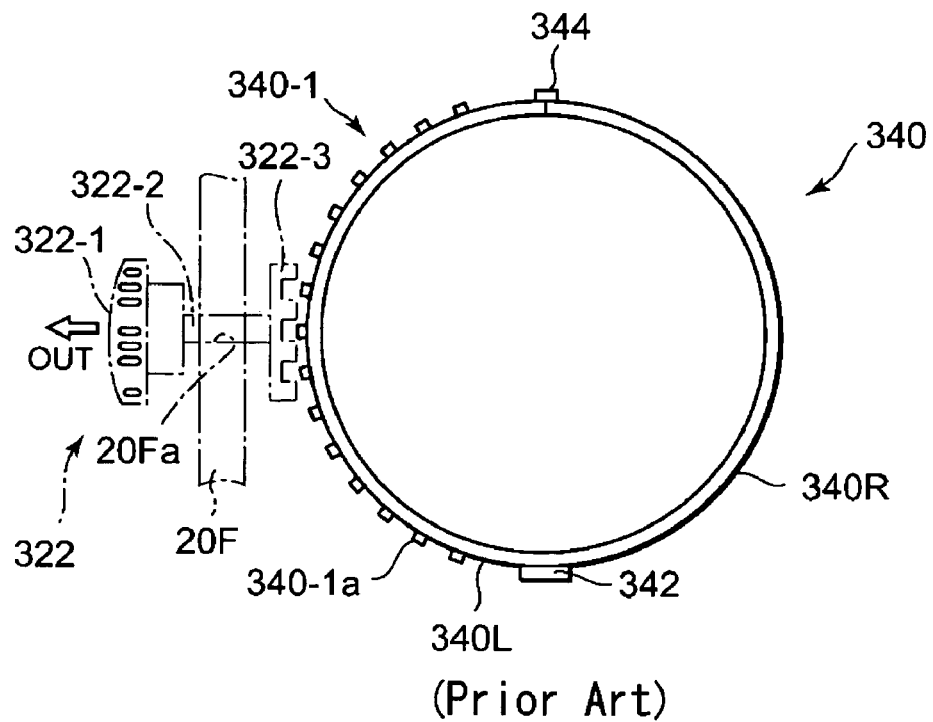
FIG. 7A is a plan view showing a conventional dial ratchet wheel and an adapter ring before engaging.
Figure 7B:
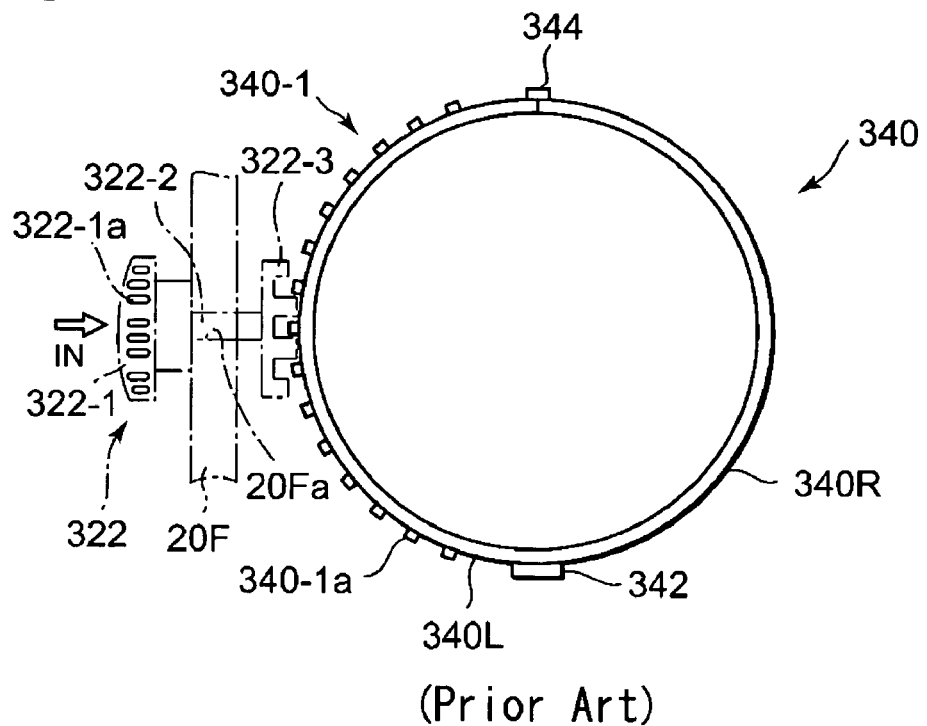
FIG. 7B is a plan view showing a state in which the conventional engaging dial ratchet wheel engages with the adapter ring.

In the first embodiment, the adapter ring 40 can be attached to the operation ring of the photographing lens barrel from only one opening, but in the second embodiment, as shown in FIG. 5, an adapter ring 40a' can be attached to an operation ring from both of openings. In the second embodiment, the flange 40a which has been disposed in the adapter ring 40 in the first embodiment is omitted. Protrusion groups 40-1a', 40-2a' are constituted by extending the protrusion groups 40-1a, 40-2a toward the rotation center (photographing lens optical axis direction) of the adapter ring, and stoppers 40-1b', 40-2b' are similarly constituted by extending the stoppers 40-1b, 40-2b toward the rotation center (photographing lens optical axis direction) of the adapter ring. In this case, unlike the first adapter ring 340, even when a half of one protrusion group in a length direction, for example, the half of the protrusion group 40-1a' in the length direction is worn, a position where the adapter ring 40a' is attached to the operation ring can be changed in a circumferential direction, and the adapter ring can be used until the half of the protrusion group 40-2a' is worn. Furthermore, after the protrusion group 40-2a' is worn, the adapter ring 40a' is attached to the operation ring from the opposite opening of the adapter ring 40a', and the adapter ring can be used until the remaining half of the protrusion group 40-1a' is worn. Furthermore, after this half of the protrusion group 40-1a' is worn, the position where the adapter ring 40a' is attached to the operation ring can be changed in the circumferential direction, and the adapter ring can be used until the remaining half of the protrusion group 40-2a' is worn. In this manner, the protrusion groups can engage with pawls 22-3a of a ratchet wheel 22-3 in four positions in total, and use life of the adapter ring can be lengthened.

According to the above first and second embodiments, there are arranged a plurality of sets of projecting portion groups constituted of a plurality of projecting portions to engage the pawls of the ratchet wheel, and the unused projecting portion group is on standby as the spare projecting portion group. Therefore, even if the projecting portions are worn, one adapter ring itself can repeatedly be utilized as the spare, and the photographing in water can continuously be performed without any spare adapter ring.

Moreover, as the adapter ring of the present invention, the example has been described in which the adapter ring is applied to the zoom ring as the operation ring of the photographing lens, but the adapter ring may be applied to a rotation ring which is another operation ring, for example, a focusing ring.

The present invention is applicable to a broad range in the underwater photographing in which the photographing lens barrel (zoom lens) is used.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An adapter ring for rotation of a photographing lens barrel, the adapter ring being fitted into an outer periphery of the photographing lens barrel, the adapter ring being rotated through engaging with a ratchet wheel having a plurality of pawls which ratchet wheel rotates in conjunction with a dial disposed in a waterproof protector, the adapter ring comprising:

a plurality of first projecting portions arranged in a predetermined angle range around an optical axis in the outer periphery to engage with the pawls of the ratchet wheel; and a plurality of second projecting portions which are the same plurality of projecting portions as the plurality of first projecting portions, the second projecting portions being arranged in a predetermined angle range but out of the predetermined angle range of the plurality of first projecting portions, wherein the rotating adapter ring is molded of an elastically deformable rubber-like member.

2. The adapter ring for the rotation of the photographing lens barrel according to claim 1, wherein on or out of the opposite ends of arrangements of the plurality of projecting portion, rotation limiting protrusions are formed which limit the rotation of the adapter ring by the ratchet wheel.

3. The adapter ring for the rotation of the photographing lens barrel according to claim 1, wherein the rotating adapter ring is configured to be attached to an operation ring of the photographing lens from each of the opposite end surfaces of the rotating adapter ring.

4. An adapter ring for the rotation of the photographing lens barrel, the adapter ring being fitted into an outer periphery of the photographing lens barrel, the adapter ring being rotated through engaging with a ratchet wheel having a plurality of pawls which ratchet wheel rotates in conjunction with a dial disposed in a waterproof protector, wherein a projecting portion group having a plurality of projecting portions to engage with the pawls of the ratchet wheel is disposed in a predetermined angle range around an optical axis in the outer periphery, and another projecting portion group having the same shape as that of the projecting portion group is disposed in the outer periphery, and the rotating adapter ring is molded of an elastically deformable rubber-like member.

5. The adapter ring for the rotation of the photographing lens barrel according to claim 4, wherein on or out of the opposite ends of arrangements of the plurality of projecting portions, rotation limiting protrusions are formed which limit the rotation of the adapter ring by the ratchet wheel.

6. The adapter ring for the rotation of the photographing lens barrel according to claim 4, wherein the rotating adapter ring is configured to be attached to an operation ring of the photographing lens from each of the opposite end surfaces of the rotating adapter ring.

* * * * *

UNITED STATES PATENT AND TRADEMARK OFFICE
CERTIFICATE OF CORRECTION

| | | |
|---|---|---|
| PATENT NO. | : 7,616,880 B2 | Page 1 of 1 |
| APPLICATION NO. | : 11/491760 | |
| DATED | : November 10, 2009 | |
| INVENTOR(S) | : Shirako et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Nineteenth Day of October, 2010

David J. Kappos
*Director of the United States Patent and Trademark Office*